United States Patent
Park

(10) Patent No.: US 11,144,708 B1
(45) Date of Patent: Oct. 12, 2021

(54) METHOD OF DYNAMICALLY PROVIDING LAYOUT DURING RUNTIME OF API-BASED WEB APPLICATION AND SYSTEM USING THE SAME

(71) Applicant: pplink, Inc., Seoul (KR)

(72) Inventor: Ju Rung Park, Seoul (KR)

(73) Assignee: pplink, Inc., Seoul (KR)

( * ) Notice: Subject to any disclaimer, the term of this patent is extended or adjusted under 35 U.S.C. 154(b) by 0 days.

(21) Appl. No.: 17/349,237

(22) Filed: Jun. 16, 2021

(30) Foreign Application Priority Data

Nov. 16, 2020 (KR) .......................... 1020200152469

(51) Int. Cl.
| | |
|---|---|
| *G06F 40/12* | (2020.01) |
| *G06F 16/958* | (2019.01) |
| *G06F 9/54* | (2006.01) |
| *G06F 21/31* | (2013.01) |

(52) U.S. Cl.
CPC .............. *G06F 40/12* (2020.01); *G06F 9/541* (2013.01); *G06F 16/986* (2019.01); *G06F 21/31* (2013.01)

(58) Field of Classification Search
None
See application file for complete search history.

(56) References Cited

U.S. PATENT DOCUMENTS

| | | | | |
|---|---|---|---|---|
| 7,827,494 B1 * | 11/2010 | Hedayatpour | ............ | G06F 8/38 715/742 |
| 8,615,708 B1 * | 12/2013 | Hidayat | ................ | G06F 40/143 715/236 |
| 2004/0083463 A1 * | 4/2004 | Hawley | .................... | G06F 9/451 717/140 |
| 2005/0076294 A1 * | 4/2005 | DeHamer | ............. | G06F 16/258 715/248 |
| 2014/0229818 A1 * | 8/2014 | Goswami | ............... | G06F 40/131 715/234 |
| 2015/0339268 A1 * | 11/2015 | Bednarz, Jr. | ............ | G06F 40/14 715/248 |
| 2016/0041954 A1 * | 2/2016 | Bloch | ...................... | G06F 40/14 715/234 |
| 2016/0048307 A1 * | 2/2016 | Troyer | .................... | G06F 9/454 715/801 |
| 2016/0103928 A1 * | 4/2016 | Glasgow | ............. | G06F 3/04842 715/234 |
| 2018/0032627 A1 * | 2/2018 | Margatan | ................. | H04L 67/10 |

FOREIGN PATENT DOCUMENTS

| | | | |
|---|---|---|---|
| KR | 1020120045152 A | | 5/2012 |
| KR | 102038664 B1 | | 10/2019 |

OTHER PUBLICATIONS

Non Final Office Action on Korean Patent Application No. 10-2020-0152469 dated Jan. 29, 2021.

* cited by examiner

*Primary Examiner* — Qing Chen
(74) *Attorney, Agent, or Firm* — Dinsmore & Shohl LLP; Yongsok Choi, Esq.

(57) ABSTRACT

Provided is a method of dynamically providing a layout during a runtime of an application programming interface (API)-based application, including: transmitting, from a user device to a service server, user authentication-related information and an access request; requesting, by the service server, an API server to generate a token; transmitting the token generated by the API server to the user device via the service server; transmitting, by the user device, the token to the API server; and providing, by the API server, layout information to the user device.

10 Claims, 5 Drawing Sheets

FIG.1

```
{
  "component": "div",
  "props": {
    "style": {
      "position": "fixed",
      "top": 0,
      "left": 0,
      "right": 0,
      "bottom": 0,
      "display": "flex",
      "flexDirection": "column"
    }
  },
  "children": [
    {
      "component": "SideBar",
      "props": {
        "isHorizontal": true,
        "borderBottom": true
      },
      "children": [
        {
          "component": "Pane",
          "props": {
            "background": "tint2",
            "display": "flex",
            "flexDirection": "column",
            "style": {
              "justifyContent": "space-between"
            }
          },
          ⋮
```

METHOD OF DYNAMICALLY PROVIDING LAYOUT DURING RUNTIME OF API-BASED WEB APPLICATION AND SYSTEM USING THE SAME

CROSS-REFERENCE TO RELATED APPLICATION

This application claims the benefit of Korean Patent Application No. 10-2020-0152469, filed on Nov. 16, 2020, in the Korean Intellectual Property Office, the disclosure of which is incorporated herein in its entirety by reference.

BACKGROUND

1. Field

The disclosure relates to a method of dynamically providing a layout during a runtime of an application programming interface (API)-based web application, and a system using the same. More particularly, the disclosure relates to a method and system for dynamically providing a user-customized layout during a runtime of a web application such that a company directly operating a service is able to easily manage and modify a layout provided to users.

2. Description of the Related Art

With the development of Internet and communication technology and the spread of non-face-to-face culture, applications related to remote communication, such as video calls, video conferences, online conferences, electronic conferences, and collaboration systems, participated by a plurality of user terminals, are being gradually variously used.

Here, various functions provided to users, such as video conference solutions, in addition to development and operation of operating company-related servers that directly operate business to provide services to customers, may be provided, via external application programming interface (API) servers, in forms of web application provided to separate development companies or API providing companies.

At this time, required user interface (UI)/user experience (UX) environments of applications vary depending on purpose of use of each user, and the purpose of use varies according to users or situations whereas built-in source technology is similar. Accordingly, when a screen layout needs to be shown differently according to a purpose of use, a new program needs to be generated every time.

Particularly, in remote communication software, such as video conference solutions, it is essential to provide different layouts according to situations and natures of services, because required functions vary widely, and thus a method and system for dynamically providing a layout provided to a user are required.

SUMMARY

Provided are a method and system for enabling a service providing company to provide various layouts to users and manage the various layouts, by dynamically providing a layout during a runtime of a web application.

Also, provided is a layout management console for enabling a service providing company or user to conveniently generate, modify, or delete a layout in an easy way, thereby providing user convenience.

Also, provided is a layout by parsing layout data from a web application during a runtime, thereby increasing a range of layout modification in one application.

Also, provided are a method and system for dynamically modifying a layout, wherein the layout may be dynamically modified even while an application is in use.

Additional aspects will be set forth in part in the description which follows and, in part, will be apparent from the description, or may be learned by practice of the presented embodiments.

According to an embodiment of the disclosure, a method of dynamically providing a layout during a runtime of an application programming interface (API)-based application, includes: transmitting, from a user device to a service server, user authentication-related information and an access request; requesting, by the service server, an API server to generate a token; transmitting the token generated by the API server to the user device via the service server; transmitting, by the user device, the token to the API server; and providing, by the API server, layout information to the user device.

The layout information may be generated in a structure defined in JavaScript object notation (JSON) grammar.

The user device may be configured to parse the layout information received from the API server during the runtime and render a layout.

The layout information may be modifiable even while the API-based application is in use.

The layout information may be modifiable by an administrator related to the service server, by using a layout management console provided via the API server.

The token generated by the API server may include layout identification information corresponding to the user device.

The layout information may include information related to a function and screen attribute provided by the API-based application.

According to another embodiment of the disclosure, a system for dynamically providing a layout during a runtime of an application programming interface (API)-based application, includes: a user device configured to transmit, to a service server, user authentication-related information and an access request; and an API server configured to receive, from the service server, a request to generate a token including layout identification information, and transmit the generated token to the user device via the service server, wherein, in response to transmitting, by the user device, the generated token to the API server, the API server is further configured to provide layout information to the user device.

The layout information may be generated in a structure defined in JavaScript object notation (JSON) grammar.

The user device may be configured to parse the layout information received from the API server during the runtime and render a layout.

The layout information may be modifiable even while the API-based application is in use.

The layout information may be modifiable by an administrator related to the service server, by using a layout management console provided via the API server.

The token generated by the API server may include layout identification information corresponding to the user device.

The layout information may include information related to a function and screen attribute provided by the API-based application.

BRIEF DESCRIPTION OF THE DRAWINGS

These and/or other aspects will become apparent and more readily appreciated from the following description of the embodiments, taken in conjunction with the accompanying drawings in which:

FIG. 1 illustrates an example of layout information of a web application, which is defined in JavaScript object notation (JSON) grammar, according to an embodiment of the disclosure;

DETAILED DESCRIPTION

Hereinafter, the disclosure will be described in detail with reference to the accompanying drawings such that one of ordinary skill in the art may easily implement the disclosure. However, the disclosure may be implemented in various different forms and is not limited to embodiments described herein.

Terms used herein are intended to describe embodiments and are not intended to limit the disclosure. In the present specification, an expression used in the singular encompasses an expression in the plural, unless it has a clearly different meaning in the context.

Terms such as "comprises" and "comprising" used in the present specification are not intended to preclude the possibility that one or more other components, steps, operations, and/or devices may exist or may be added.

While terms including ordinal numbers, such as "first", "second", etc., may be used to describe various components, such components must not be limited to the above terms. The above terms are used only to distinguish one component from another. In the description of the disclosure, certain detailed explanations of related art are omitted when it is deemed that they may unnecessarily obscure the essence of the disclosure.

Further, components shown in embodiments of the disclosure are independently illustrated to represent different characteristic functions, and it does not mean that the components are formed in units of separate pieces of hardware or single piece of software. In other words, the components are described by listing the components for convenience of description, and at least two components may form one component or one component may be divided into a plurality of components to perform a function. An integrated embodiment and separated embodiments of each component are also included in the scope of the disclosure unless deviated from the essence of the disclosure.

Hereinafter, embodiments of the disclosure will be described in detail with reference to accompanying drawings. Configurations of the disclosure and functional effects thereof will be clearly understood through the following detailed description.

Figures 2, 3:
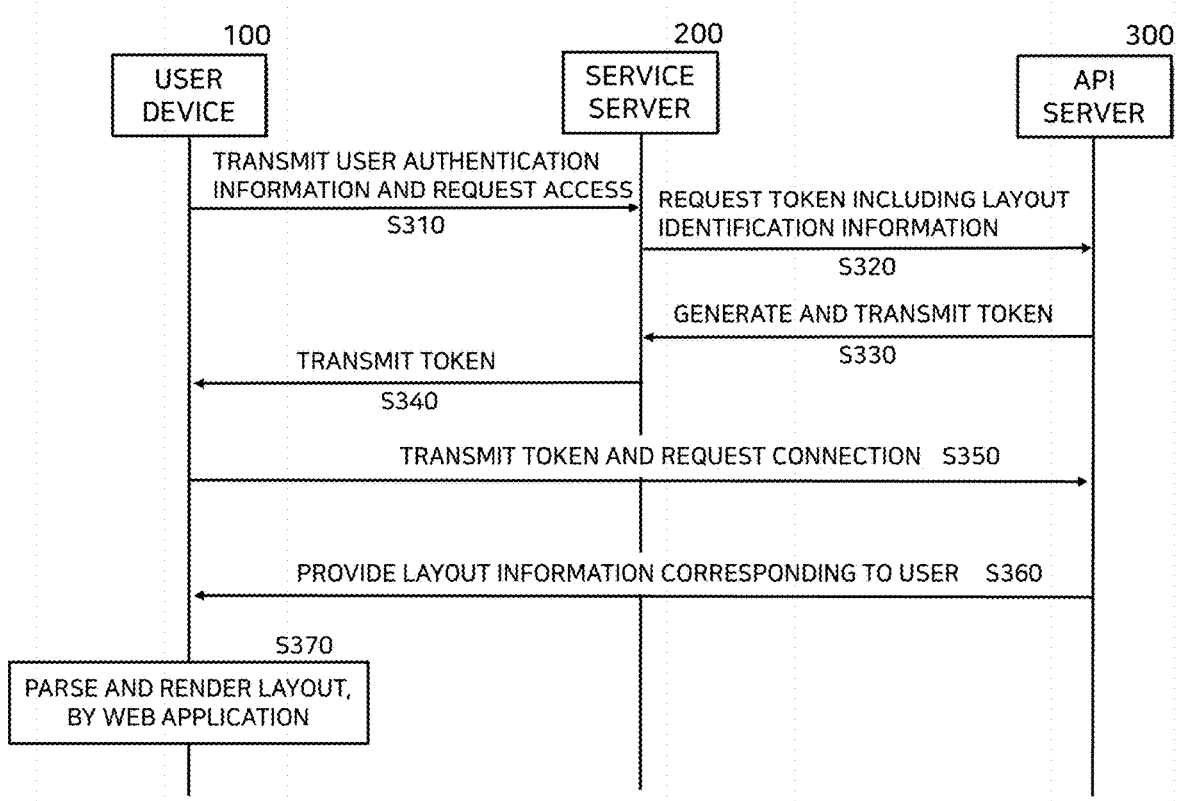
FIG. 2 illustrates an example of a layout edit screen, wherein layout information of a web application is defined in JavaScript extensible mark-up language (XML) (JSX) grammar, according to an embodiment of the disclosure.
FIG. 3 is a flowchart for describing a configuration of a system and method of dynamically providing a layout during a runtime of an application programming interface (API)-based application, according to an embodiment of the disclosure.

FIG. 1 illustrates an example of layout information of a web application, which is defined in JavaScript object notation (JSON) grammar, according to an embodiment of the disclosure, and FIG. 2 illustrates an example of a layout edit screen, wherein layout information of a web application is defined in JavaScript extensible mark-up language (XML) (JSX) grammar, according to an embodiment of the disclosure.

According to the disclosure, to enable a development company developing and providing a web application via an application programming interface (API) server to directly configure and manage a layout required by a service provider directly operating business, the layout information defined in the JSON grammar that is a first format, as in FIG. 1, may be provided by being converted into the JSX grammar that is a second format similar to HTML, as in FIG. 2, such that web developers easily modify and manage the layout information.

As shown in FIG. 2, the layout edit screen in a JSX format, which may be easily modified and managed by an administrator of the service provider or a user of a user device, may be provided through a layout management console via the API server, and an editor may be provided such that users may freely generate, modify, and delete a layout generated inside the layout management console. In FIG. 2, the editor of the layout management console is provided, for example, in the JSX format, i.e., a format easily modified by developers. Alternatively, an enhanced user experience (UX)/user interface (UI) may be provided for an administrator or user, who does not have code modifying ability, to easily use the enhanced UX/UI by providing a graphics user interface (GUI) what you see is what you get (WYSIWYG) editor. As such, the layout management console enabling a service providing company or user to conveniently generate, modify, or delete a layout in an easy way may be provided, thereby providing user convenience.

When modifying and editing the layout information into the JSX format are completed as shown in FIG. 2, the layout information is converted into a JSON format as shown in FIG. 1 and stored, and a database (DB) of such layout information may be stored in the API server managed by a web application development company.

According to the disclosure, the layout is provided by parsing layout data from the DB stored in the API server, during a runtime of an application, and rendering the layout data. A general application has layout information, such as an application program format or function, pre-determined during compiling and building operations, but according to the disclosure, layout information, such as a program format or function, is determined during a runtime of an application, instead of a building operation. Accordingly, a range of layout modification may be diversified in one application according to needs of the administrator or user, and in addition, the layout may be dynamically modified even while the application is in use.

Also, in the current embodiment, a software program is described as a web application, but the software program is not limited thereto and may be applied to various types of application programs.

FIG. 3 is a flowchart for describing a configuration of a system and method of dynamically providing a layout during a runtime of an API-based application, according to an embodiment of the disclosure.

A user device 100 is a device used by a customer using a service, and may be any one of a smart phone, a tablet computer, a desktop computer, a laptop computer, a notebook computer, a workstation, a personal digital assistant (PDA), a portable computer, a wireless phone, a mobile phone, an e-book, a portable multi media player (PMP), a portable game device, a digital camera, a television, a wearable device, and a vehicle, but is not limited thereto.

A service server 200 is a server operated and managed by a service provider who directly operates business by providing a service to a customer, and an API server 300 is a server operated and managed by a development company that develops and provides a web application for the service provider, and for example, the development company may provide remote communication software, such as a video conference solution, to the service provider via the API server 300.

Referring to the method according to an embodiment of the disclosure, first, the user device 100 may request the service server 200 for a service access while transmitting user authentication information for user authentication (operation S310).

The service server 200 may request the API server 300 to generate a token including layout identification information (operation S320). The API server 300 requires a mechanism for authenticating and authorizing a client user and may realize efficient access authority management via token-based authentication. The service server 200 may transmit, to the API server 300, the layout identification information matched to the user device 100 while requesting the token such that the token generated by the API server 300 includes the layout identification information.

Here, the generated and issued token includes the layout identification information matched to a corresponding user, may be, for example, a Jason web token (JWT) having a JSON format or may have any one of various formats, and may be encoded by using a symmetric key via a hash-based message authentication code (HMAC) algorithm, by using an asymmetric key via a Rivest, Shamir, and Adelman (RSA) algorithm or elliptic curve digital signature algorithm (ECDSA), or via any other method. An encoding method is not limited to a specific method.

The layout identification information matched to the user of the user device 100 may be determined by layout information matched to the service provider, which is pre-configured by an administrator of the service provider in a format suitable to a service of the service provider, or the layout identification information different for each user may be dynamically generated to provide different layouts for each user.

Then, the API server 300 generates and issues the token and transmits the token to the service server 200 (operation S330), the token is transmitted to the user device 100 via the service server 200 (operation S340), and the user device 100 stores the token at a client side.

The user device 100 may request a connection to a corresponding web application while transmitting the token received from the service server 200 to the API server 300 (operation S350). Here, the API server 300 may invoke, from a DB, layout information corresponding to the user and provide, to the user device 100, the layout information corresponding to the user (operation S360).

Then, the web application parses layout data from the DB stored in the API server 300 during a runtime and renders the layout data to provide a layout (operation S370), thereby dynamically providing the layout corresponding to the user device 100.

According to the disclosure, layouts of a web application are not pre-determined, but an editor that provides, to a user or administrator, only components configuring a layout, attributes of the components, and a rendering logic of mounting the components on an application program, enables the user or administrator to freely modify a specific layout by using a layout management console, and enables developers to easily modify the layout may be provided.

For example, examples of the components configuring the layout include a mute function, a shared whiteboard, a whiteboard toolbar (a pen, an eraser, and a highlight), a chatting function, a memo, a network stability display portion, an emoticon, a counterpart video display portion, a self-video display portion, a guide message display portion, a timer, a title display portion, and a watermark function for preventing data leakage, but are not limited thereto.

Also, examples of the attributes of the components include location-related information about where the components are arranged on a screen, design-related information, such as colors and sizes, an arrangement order of a camera, a microphone, a speaker, screen sharing, and the like, and presence of function display, but are not limited thereto.

By freely modifying and changing the components and attributes of the layout, a range of modification of the layout may be freely increased according to needs of a user.

FIGS. 4A through 4E illustrate examples for describing various types of layouts provided in a web application, according to embodiments of the disclosure.

Figure 4A:
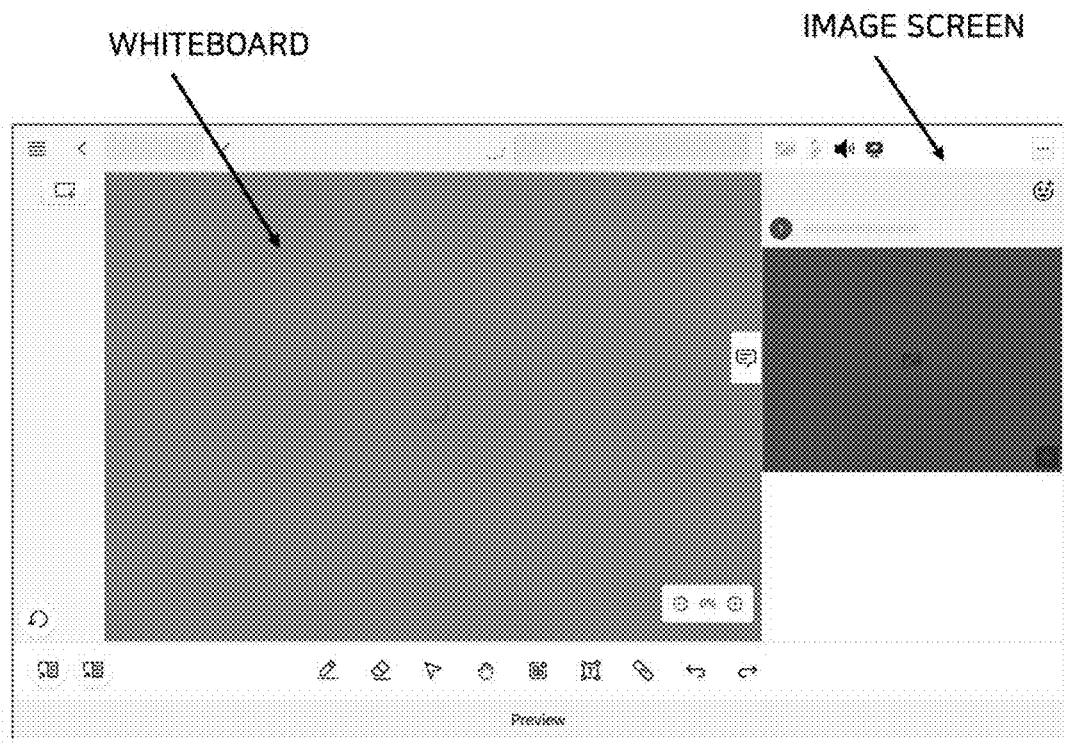
FIGS. 4A through 4E illustrate examples for describing various types of layouts provided in a web application, according to embodiments of the disclosure.

Referring to FIG. 4A, a layout including, at a left side, a whiteboard tool bar including a pen, an eraser, a highlight, and a text input, and, at a right side, an image screen indicating a communicating screen, may be displayed.

Figure 4B:
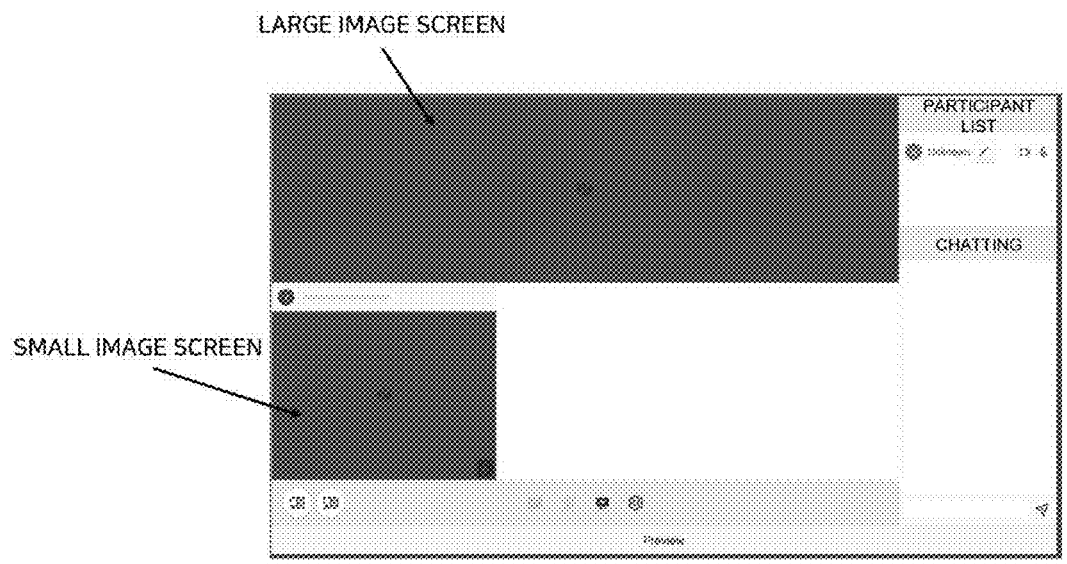

Referring FIG. 4B, only image screens are used, and a layout including a large image screen at a top and a small image screen at a bottom may be displayed.

Figure 4C:
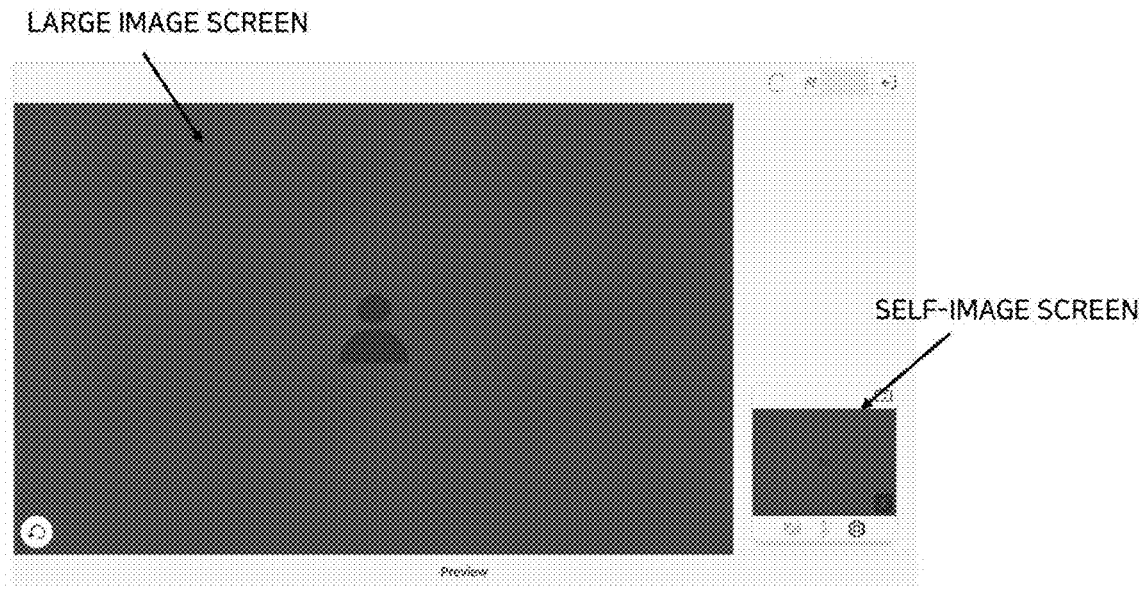

Referring to FIG. 4C, only image screens are used, and a layout including a large image screen at a left side and a self-image screen at a right side may be displayed.

Figure 4D:
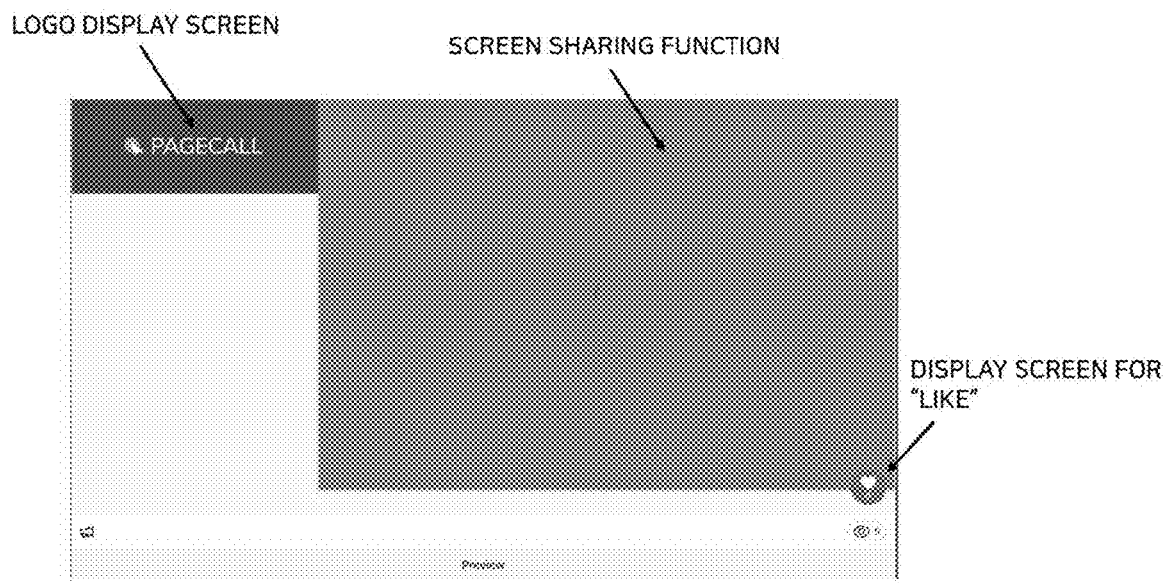

Referring to FIG. 4D, a layout including a logo display screen indicating a service provider at an upper left side, and a screen sharing function and a "Like" display screen at a right side may be displayed.

Figure 4E:
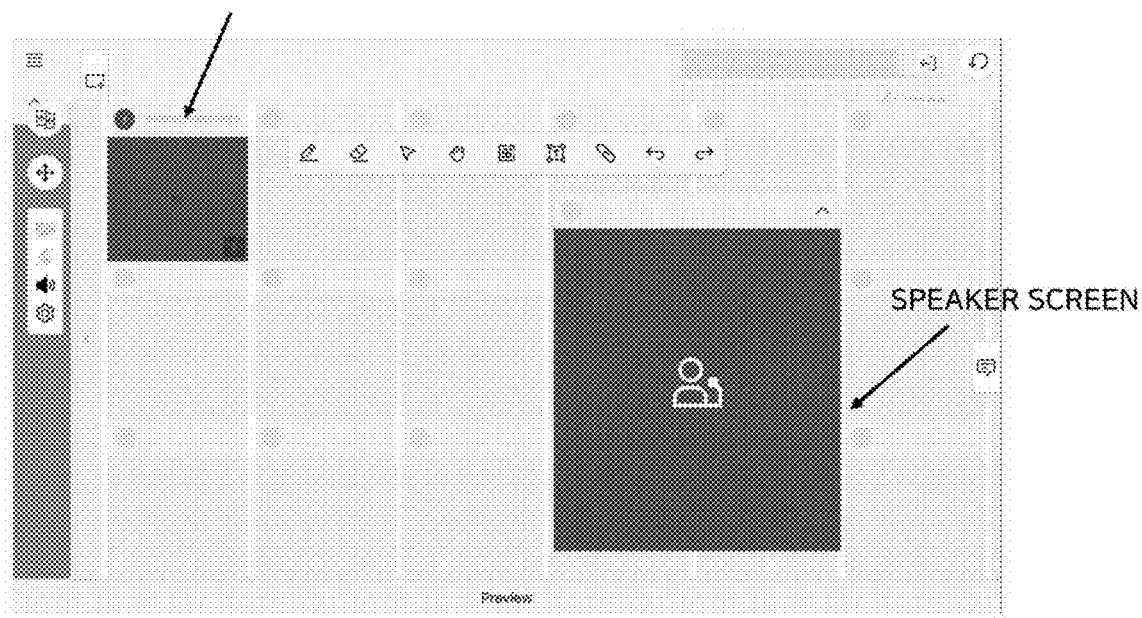

Referring to FIG. 4E, a layout including a plurality of image screens and a speaker screen when a plurality of participants participate may be displayed.

As described in the above embodiments, while a service provider operates business, for example, a layout specialized for a whiteboard function may be required when notes of users are important, a layout emphasizing an image screen may be required when a video image is more important, and a layout specialized for a plurality of image screens and a speaker screen may be required during a video class or web seminar with a plurality of participants and a speaker.

According to the disclosure, an API server provides a layout management console such that a service provider may configure a layout suitable to a service and directly manage the layout, or a user may directly manage a suitable layout.

According to the disclosure, a method and system for enabling a service providing company to provide various layouts to users and manage the various layouts, by dynamically providing a layout during a runtime of a web application, can be provided.

Also, according to the disclosure, a layout management console for enabling a service providing company or user to conveniently generate, modify, or delete a layout in an easy way can be provided, thereby providing user convenience.

Also, according to the disclosure, a layout can be provided by parsing layout data from a web application during a runtime, thereby increasing a range of layout modification in one application.

Also, according to the disclosure, a method and system for dynamically modifying a layout can be provided, wherein the layout can be dynamically modified even while an application is in use.

The effects of the disclosure are not limited to those mentioned above, and other effects that are not mentioned may be clearly understood by one of ordinary skill in the art from the detailed description.

While a method and system for dynamically providing a layout during a runtime of an API-based application, according to an embodiment of the disclosure, have been described with reference to various specific embodiments, these are only examples and the disclosure is not limited thereto. The disclosure should be construed as having a widest range in accordance with the basic idea disclosed herein. One of ordinary skill in the art may combine or substitute the disclosed embodiments to execute a pattern of a shape that is not specified, without departing from the scope of the disclosure. In addition, one of ordinary skill in the art may easily change or modify the embodiments based on the present specification, and it is obvious that such a change or modification are within the scope of the disclosure.

What is claimed is:

1. A method of dynamically providing an application layout during a runtime of an application programming interface (API)-based application, the method comprising:
   transmitting, from a user device to a service server, user authentication-related information of a user and a service access request;
   requesting, by the service server, an API server to generate a token including layout identification information corresponding to the user device;
   transmitting, by the API sever, the generated token to the service server;
   transmitting, by the service server, the generated token to the user device;
   transmitting, by the user device, the generated token and a connection request to the API-based application to the API server; and
   providing, by the API server, layout information corresponding to the user to the user device,
   wherein the user device is configured to parse the layout information corresponding to the user received from the API server during the runtime of the API-based application and render the application layout.

2. The method of claim 1, wherein the layout information corresponding to the user is generated in a structure defined in JavaScript object notation (JSON) grammar.

3. The method of claim 1, wherein the layout information corresponding to the user is modifiable even while the API-based application is in use.

4. The method of claim 1, wherein the layout information corresponding to the user is modifiable by an administrator related to the service server, by using a layout management console provided via the API server.

5. The method of claim 1, wherein the layout information corresponding to the user includes information related to a function and screen attribute provided by the API-based application.

6. A system for dynamically providing an application layout during a runtime of an application programming interface (API)-based application, the system comprising:
   a user device configured to transmit, to a service server, user authentication-related information of a user and a service access request;
   a service server configured to request an API server to generate a token including layout identification information corresponding to the user device;
   an API server configured to transmit the generated token to the service server,
   wherein the service server is further configured to transmit the generated token to the user device,
   wherein the user device is further configured to transmit the generated token and a connection request to the API-based application to the API server,
   wherein the API server is further configured to provide layout information corresponding to the user to the user device, and
   wherein the user device is further configured to parse the layout information corresponding to the user received from the API server during the runtime of the API-based application and render the application layout.

7. The system of claim 6, wherein the layout information corresponding to the user is generated in a structure defined in JavaScript object notation (JSON) grammar.

8. The system of claim 6, wherein the layout information corresponding to the user is modifiable even while the API-based application is in use.

9. The system of claim 6, wherein the layout information corresponding to the user is modifiable by an administrator related to the service server, by using a layout management console provided via the API server.

10. The system of claim 6, wherein the layout information corresponding to the user includes information related to a function and screen attribute provided by the API-based application.

* * * * *